United States Patent
Buth et al.

(10) Patent No.: US 6,898,522 B2
(45) Date of Patent: May 24, 2005

(54) SYSTEM AND METHOD FOR PROVIDING AND DISPLAYING NAVIGATION INFORMATION

(75) Inventors: Peter Buth, Bochum (DE); Andre Köll, Herne (DE); Simona Grothues, Bochum (DE); Klaus Kespohl, Bochum (DE)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/450,337

(22) PCT Filed: Dec. 5, 2001

(86) PCT No.: PCT/EP01/14227

§ 371 (c)(1),
(2), (4) Date: Dec. 23, 2003

(87) PCT Pub. No.: WO02/48651

PCT Pub. Date: Jun. 20, 2002

(65) Prior Publication Data

US 2004/0093153 A1 May 13, 2004

(30) Foreign Application Priority Data

Dec. 11, 2000 (DE) .......................................... 100 61 646

(51) Int. Cl.[7] .............................................. G01C 21/36
(52) U.S. Cl. ................... 701/211; 340/995.19
(58) Field of Search ................................. 701/209, 211, 701/201; 340/995.19, 995.24, 995.27; 342/357.09, 357.1

(56) References Cited

U.S. PATENT DOCUMENTS

| | | | |
|---|---|---|---|
| 4,937,570 | A | 6/1990 | Matsukawa et al. |
| 5,402,120 | A | 3/1995 | Fujii et al. |
| 5,654,892 | A | 8/1997 | Fujii et al. |

FOREIGN PATENT DOCUMENTS

| | | |
|---|---|---|
| DE | 4401206 | 7/1995 |
| DE | 19531822 | 4/1996 |
| DE | 19611915 | 10/1997 |
| DE | 19637011 | 3/1998 |
| EP | 0838663 | 4/1998 |
| EP | 0875878 | 11/1998 |
| EP | 0995973 | 4/2000 |
| GB | 2260210 | 4/1993 |

*Primary Examiner*—Michael J. Zanelli

(57) ABSTRACT

The invention relates to a navigation system, a terminal and a processing device for a navigation system, as well as a method for displaying navigation icons on display means of a terminal. In order to make efficient use of the storage space in the terminal and to allow flexible display of navigation icons, the storage of partial graphics in the terminal is proposed, with navigation icons being able to be composed from said partial graphics. To display a currently suitable navigation icon, the required partial graphics are then selected and composed to form the navigation icon. A processing device according to the invention is able to provide information which makes it possible for the terminal to determine the required partial graphics. The invention also relates to a module for a terminal or for a processing device comprising respective processing means.

23 Claims, 13 Drawing Sheets

```
typedef struct
    {
    BITMAP_ID bitmap_id;
    uint8 x_start;
    uint8 y_start;
    } WIN_BITMAP_OFFSET_STR;
#   define NAV_OFFSET_DATA( Name, BitmapId, XOffset, YOffset) \
    ( BitmapId, XOffset, YOffset ),
        const WIN_BITMAP_OFFSET_STR
nav_offset_tbl[NAV_OFFSET_COUNT] =
        {
include "nav_conf.h"
        };
undef NAV_OFFSET_DATA
```

FIG. 2a

```
typedef struct
    {
    uint8 x_offset;
    uint8 y_offset;
    } NAV_COMB_OFFSET_STR;

#   define NAV_COMB_OFFSET_DATA( Name, XOffset, YOffset) \
    ( XOffset, YOffset ),
        const NAV_COMB_OFFSET_STR
nav_comb_offset_tbl[NAV_COMB_OFFSET_COUNT] =
        {
include "nav_conf.h"
        };
undef NAV_COMB_OFFSET_DATA
```

FIG. 2b

```
/* Read navigation icon names */
#   define NAV_OFFSET_DATA( Name, BitmapId, XOffset, YOffset) \
    Name,
    enum nav_id
    {
include "nav_conf.h"
    NAV_OFFSET_COUNT  /* always the last item! */
    };
undef NAV_OFFSET_DATA
```

FIG. 3a

```
/* Read names of composed navigation icons */
#   define NAV_COMB_OFFSET_DATA( Name, XOffset, YOffset) \
    Name,
    enum nav_comb_id
    {
include "nav_conf.h"
    NAV_COMB_OFFSET_COUNT  /* always the last item! */
    };
undef NAV_COMB_OFFSET_DATA
```

```
NAV_OFFSET_DATA(
  JUNC_EXIT_5, /* name of DRA icon element, used by the UI
application */
  BITM_STP_NAV_ARROW_5,. /* name of the to be used bitmap */
  12, /* offset in x direction referring to the complete DRA
icon */
  1) /* offset in y direction referring to the complete DRA
icon */
```

FIG. 5a

```
NAV_COMB_OFFSET_DATA(
  SINGLE_JUNC, /* name of complete DRA icon, used by the UI
application */
  24, /* offset in x direction referring to the position on
the display */
  4) /* offset in y direction referring to the position on the
display */
```

FIG. 5b

```
typedef struct
    {
        uint8 bitmap_quantity; /* number of the to be displayed
bitmaps*/
        WIN_BITMAP_OFFSET_STR *bitmap_list; /* ptr to the bitmap
                                               identifier inclusive
                                               the x-y-offset */
    } WIN_NAV_BITMAP_STR;

typedef struct
    {
        BITMAP_ID bitmap_id; /* bitmap identifier */
        uint8 x_start; /* bitmap offset in x direction */
        uint8 y_start; /* bitmap offset in y direction */
    } WIN_BITMAP_OFFSET_STR;
```

FIG. 6

```
1  /* data structures */
   static WIN_NAV_BITMAP_STR nav_maneuver_data;
   uint8 i, j, k = 0;

2  /* code extract*/

/* the number of bitmaps to be displayed */
   nav_maneuver_data.bitmap_quantity = 16;

3  /* allocate memory for the DRA icon data */
   nav_maneuver_data.bitmap_list = (WIN_BITMAP_OFFSET_STR*)
                                   os_block_alloc(
                                   nav_maneuver_data.bitmap_quantity
                                   *sizeof(WIN_BITMAP_OFFSET_STR));

4  /* start with the DRA icon elements of the first (basic)
      junction. */
5  /* 1. icon - vertical entry street element */
   nav_maneuver_data.bitmap_list[i].bitmap_id =
                                   nav_offset_tbl[JUNC_VERTICAL].bitmap_id;
   nav_maneuver_data.bitmap_list[i].x_start =
   nav_offset_tbl[JUNC_VERTICAL].x_start;
   nav_maneuver_data.bitmap_list[i].y_start =
   nav_offset_tbl[JUNC_VERTICAL].y_start;

6  /* 2. icon - additional street element in intersection geometry
      direction 1 */
   i++;
   nav_maneuver_data.bitmap_list[i].bitmap_id =
                                   nav_offset_tbl[JUNC_STREET_1].bitmap_id;
   nav_maneuver_data.bitmap_list[i].x_start =
   nav_offset_tbl[JUNC_STREET_1].x_start;
   nav_maneuver_data.bitmap_list[i].y_start =
   nav_offset_tbl[JUNC_STREET_1].y_start;

7  /* 3. icon - additional street element in intersection geometry
      direction 2 */
   i++;
   nav_maneuver_data.bitmap_list[i].bitmap_id =
                                   nav_offset_tbl[JUNC_STREET_2].bitmap_id;
   nav_maneuver_data.bitmap_list[i].x_start =
   nav_offset_tbl[JUNC_STREET_2].x_start;
   nav_maneuver_data.bitmap_list[i].y_start =
   nav_offset_tbl[JUNC_STREET_2].y_start;
8  /* 4. icon - additional street element in intersection geometry
      direction 3 */
   i++;
```

FIG. 8a

```
               nav_maneuver_data.bitmap_list[i].bitmap_id =
                                       nav_offset_tbl[JUNC_STREET_3].bitma
               p_id;
               nav_maneuver_data.bitmap_list[i].x_start =
               nav_offset_tbl[JUNC_STREET_3].x_start;
               nav_maneuver_data.bitmap_list[i].y_start =
               nav_offset_tbl[JUNC_STREET_3].y_start;

9    /* 5. icon - additional street element in intersection geometry
            direction 4 */
            i++;
            nav_maneuver_data.bitmap_list[i].bitmap_id =
                                       nav_offset_tbl[JUNC_STREET_4].bitma
            p_id;
            nav_maneuver_data.bitmap_list[i].x_start =
            nav_offset_tbl[JUNC_STREET_4].x_start;
            nav_maneuver_data.bitmap_list[i].y_start =
            nav_offset_tbl[JUNC_STREET_4].y_start;

10    /* 6. icon - additional street element in intersection geometry
            direction 5 */
            i++;
            nav_maneuver_data.bitmap_list[i].bitmap_id =
                                       nav_offset_tbl[JUNC_STREET_5].bitma
            p_id;
            nav_maneuver_data.bitmap_list[i].x_start =
            nav_offset_tbl[JUNC_STREET_5].x_start;
            nav_maneuver_data.bitmap_list[i].y_start =
            nav_offset_tbl[JUNC_STREET_5].y_start;

11    /* 7. icon - additional street element in intersection geometry
            direction 7 */
            i++;
            nav_maneuver_data.bitmap_list[i].bitmap_id =
                                       nav_offset_tbl[JUNC_STREET_7].bitma
            p_id;
            nav_maneuver_data.bitmap_list[i].x_start =
            nav_offset_tbl[JUNC_STREET_7].x_start;
            nav_maneuver_data.bitmap_list[i].y_start =
            nav_offset_tbl[JUNC_STREET_7].y_start;

12    /* 8. icon - connection/exit street element in intersection
            geometry direction 6*/
            i++;
            nav_maneuver_data.bitmap_list[i].bitmap_id =
                                       nav_offset_tbl[C_JUNC_HORI_EXIT_6].
            bitmap_id;
            nav_maneuver_data.bitmap_list[i].x_start =
                                       nav_offset_tbl[C_JUNC_HORI_EXIT_6].
            x_start;
            nav_maneuver_data.bitmap_list[i].y_start =
                                       nav_offset_tbl[C_JUNC_HORI_EXIT_6].
            y_start;
```

FIG. 8b

```
13  /* add the offset for the first (basic) junction, that means: the
    junction is shifted to a defined area in the left part of the
    display */
    for(j = 0;
        j <= i;
        j++)
    {
        nav_maneuver_data.bitmap_list[j].x_start +=
            nav_comb_offset_tbl[COMB_JUNC_EXIT_6].x_offset;
        nav_maneuver_data.bitmap_list[j].y_start +=
            nav_comb_offset_tbl[COMB_JUNC_EXIT_6].y_offset;
    }

14  /* add the DRA icon elements of the successor junction to the
    list */
15  /* 9. icon - connection to the exit street junction (in
    intersection geometry direction 6) element from the basic */
    i++;
    k = 1;

nav_maneuver_data.bitmap_list[i].bitmap_id =
                            nav_offset_tbl[C_JUNC_HORI_EXIT_6_S
    UC].bitmap_id;
    nav_maneuver_data.bitmap_list[i].x_start =
                            nav_offset_tbl[C_JUNC_HORI_EXIT_6_S
    UC].x_start;
    nav_maneuver_data.bitmap_list[i].y_start =
                            nav_offset_tbl[C_JUNC_HORI_EXIT_6_S
    UC].y_start;

16  /* 10. icon - additional street element of the successor junction
    in intersection geometry direction 1 */
    i++;
    nav_maneuver_data.bitmap_list[i].bitmap_id =
                            nav_offset_tbl[C_JUNC_S6_STREET_1].
    bitmap_id;
    nav_maneuver_data.bitmap_list[i].x_start =
                            nav_offset_tbl[C_JUNC_S6_STREET_1].
    x_start;
    nav_maneuver_data.bitmap_list[i].y_start =
                            nav_offset_tbl[C_JUNC_S6_STREET_1].
    y_start;

17  /* 11. icon - additional street element of the successor junction
    in intersection geometry direction 2 */
    i++;
    nav_maneuver_data.bitmap_list[i].bitmap_id =
                            nav_offset_tbl[C_JUNC_S6_STREET_2].
    bitmap_id;
```

FIG. 8c

```
                        nav_maneuver_data.bitmap_list[i].x_start =
                                        nav_offset_tbl[C_JUNC_S6_STREET_2].
     x_start;
     nav_maneuver_data.bitmap_list[i].y_start =
                                        nav_offset_tbl[C_JUNC_S6_STREET_2].
     y_start;

18   /* 12. icon - additional street element of the successor junction
     in intersection geometry direction 4 */
     i++;
     nav_maneuver_data.bitmap_list[i].bitmap_id =
                                        nav_offset_tbl[C_JUNC_S6_STREET_4].
     bitmap_id;
     nav_maneuver_data.bitmap_list[i].x_start =
                                        nav_offset_tbl[C_JUNC_S6_STREET_4].
     x_start;
     nav_maneuver_data.bitmap_list[i].y_start =
                                        nav_offset_tbl[C_JUNC_S6_STREET_4].
     y_start;

19   /* 13. icon - additional street element of the successor junction
     in intersection geometry direction 5 */
     i++;
     nav_maneuver_data.bitmap_list[i].bitmap_id =
                                        nav_offset_tbl[C_JUNC_S6_STREET_5].
     bitmap_id;
     nav_maneuver_data.bitmap_list[i].x_start =
                                        nav_offset_tbl[C_JUNC_S6_STREET_5].
     x_start;
     nav_maneuver_data.bitmap_list[i].y_start =
                                        nav_offset_tbl[C_JUNC_S6_STREET_5].
     y_start;

20   /* 14. icon - additional street element of the successor junction
     in intersection geometry direction 6 */
     i++;
     nav_maneuver_data.bitmap_list[i].bitmap_id =
                                        nav_offset_tbl[C_JUNC_S6_STREET_6].
     bitmap_id;
     nav_maneuver_data.bitmap_list[i].x_start =
                                        nav_offset_tbl[C_JUNC_S6_STREET_6].
     x_start;
     nav_maneuver_data.bitmap_list[i].y_start =
                                        nav_offset_tbl[C_JUNC_S6_STREET_6].
     y_start;

21   /* 15. icon - additional street element of the successor junction
     in intersection geometry direction 7 */
     i++;
     nav_maneuver_data.bitmap_list[i].bitmap_id =
                                        nav_offset_tbl[C_JUNC_S6_STREET_7].
     bitmap_id;
```

FIG. 8d

```
                    nav_maneuver_data.bitmap_list[i].x_start =
                                        nav_offset_tbl[C_JUNC_S6_STREET_7].
   x_start;
   nav_maneuver_data.bitmap_list[i].y_start =
                                        nav_offset_tbl[C_JUNC_S6_STREET_7].
   y_start;

22 /* 16. icon - exit street element of the successor junction in
      intersection geometry direction 3 */
   i++;
   nav_maneuver_data.bitmap_list[i].bitmap_id =
                                   nav_offset_tbl[C_JUNC_S6_EXIT_3].bi
   tmap_id;
   nav_maneuver_data.bitmap_list[i].x_start =
                                        nav_offset_tbl[C_JUNC_S6_EXIT_3].x_
   start;
   nav_maneuver_data.bitmap_list[i].y_start =
                                        nav_offset_tbl[C_JUNC_S6_EXIT_3].y_
   start;

23 /* add the offset for the successor junction, that means: the
      junction is shifted to a defined area in the right part of the
      display, so that this junction fits exactly to the basic junction
      at the intersection geometry exit leg 6 */
   for(                              j = k;
        j <=i;
        j++)
   {
   nav_maneuver_data.bitmap_list[j].x_start += nav_comb_offset_tbl[COMB_JUNC_EXIT_6_SUC].x_offset;
   nav_maneuver_data.bitmap_list[j].y_start += nav_comb_offset_tbl[COMB_JUNC_EXIT_6_SUC].y_offset;
   }
24 /* give the filled DRA icon data list to the window procedure
      here e.g. via function call*/
   win_write(WIN_MANEUVER_ICONS, &nav_maneuver_data);
```

FIG. 8e

SYSTEM AND METHOD FOR PROVIDING AND DISPLAYING NAVIGATION INFORMATION

CROSS REFERENCE TO RELATED APPLICATIONS

This application is for entry into the U.S. national phase under §371 for International Application No. PCT/EP01/14227 having an international filing date of Dec. 5, 2001, and from which priority is claimed under all applicable sections of Title 35 of the United States Code including, but not limited to, Sections 120, 363 and 365(c), and which in turn claims priority under 35 USC §119 to German Patent Application No. DE 100 61 646.1 filed on Dec. 11, 2000.

The invention relates to a navigation system, a terminal and a processing device for a navigation system, as well as a method for displaying navigation icons on display means of a terminal. The invention also relates to a module for a terminal or for a processing device for a navigation system.

BACKGROUND OF THE INVENTION

Navigation systems which make it possible to display to the driver of a vehicle navigation icons for a calculated route, are known from the state of the art. In these systems, the navigation icons above all show the progression of the calculated route at the relevant junctions. Conventionally, navigation systems access CD-ROMs integrated in the vehicle, for calculating the route and for the navigation icons to be shown, said CD-ROMs providing a large amount of storage space.

However, more modern navigation systems provide for route guidance to be already provided, from an external service provider, by way of a radio link. This not only makes possible route guidance independent of a given vehicle, but also more flexible updating and enlargement of the services offered. If the service provider offers services via the Internet, the driver in the vehicle can for example use an Internet-capable or WAP-capable mobile telephone whose display shows the navigation icons for route guidance, with communication with the service provider taking place by way of said mobile telephone.

However, as an alternative, communication between the service provider and the driver of the vehicle can also take place via SMS (Short Message Service).

To use such a system it is necessary for the driver of the vehicle to enter the starting point and the desired point of destination in his/her terminal, and to transmit these to the service provider. However, the starting point can for example also be determined automatically from the current position of the vehicle. As an alternative, the point of destination could also be specified via a telephone call to the service provider.

After this, the service provider calculates the optimal route for the vehicle and transmits respective information concerning route guidance back to the terminal. When calculating the route, factors such as current traffic reports can also be taken into account. The terminal evaluates the information concerning route guidance during the trip and at every relevant junction shows a diagram of the junction on a small display of the terminal. In addition, the respective instruction can also be output via an acoustic output unit.

Such off-board systems are associated with a problem in that for extended routes large quantities of data need to be transmitted if individual files are transmitted for every intersection along the route. As an alternative, the terminal would have to comprise a storage device of sufficient capacity to store all navigation icons that may be used.

Printed publication U.S. Pat. No. 5,654,892 describes a navigation system which displays representations of one or two upcoming junctions. To this effect, a stored symbol showing the currently required type of junction or the currently required combination of junctions, appears on the display. Storing displays of all options of turning off, and in addition, all possible combinations of two options of branching off in sequence, requires a large amount of storage space which can be provided only if a respective storage medium is available in the vehicle, with the terminal being able to access said storage medium. Otherwise, it is only possible to offer a relatively limited selection of displays, thus hindering exact and clear route support. The printed publication also mentions that the respective display can be calculated, but no further information for implementing such a calculation has been provided.

The printed publication U.S. Pat. No. 4,937,570 describes a navigation system comprising a multitude of intersecting display segments in different colours which display various routes. To display an actual route, the respective segments are activated so that they are illuminated in the colours provided. This system requires less storage space because for each route only a reference to the segments to be activated has to be stored. However, said system lacks flexibility because it is restricted to those routes which can be shown by the display segments provided.

SUMMARY OF THE INVENTION

It is thus the object of the present invention to provide a terminal as well as a processing device for a navigation system, a navigation system and a method for a navigation system, which allow flexible display of navigation icons while making efficient use of the storage space.

This object is met by a terminal for a navigation system comprising storage means for storing partial graphics from which navigation icons can be composed, comprising processing means for determining partial graphics from which a navigation icon suitable for current route guidance can be composed, for selecting the determined partial graphics from the storage means and for joining the selected partial graphics to the navigation icon, and comprising display means to display the joined navigation icon.

The term "terminal" refers to the setup of a navigation system on which route guidance by means of navigation icons can be displayed. The terminal can above all be a mobile telephone with WAP access or Internet access. Similarly, a mobile telephone with the option of communicating via SMS may be used.

Furthermore, the object is met by a processing device of a navigation system comprising receiving means for receiving start information and destination information from a terminal of the navigation system, comprising processing means for calculating a route from received starting information and received destination information, and for determining and providing information from which partial graphics can be determined in the terminal, said partial graphics making it possible to compose navigation icons suitable for route guidance, and comprising transmission means for transmitting to the terminal the information which has been provided.

The processing device can be integrated in a vehicle, communicating with the terminal. Preferably however it is a processing device of a service provider who provides the route calculations off-board via the Internet, with the processing device for the terminal being accessible by way of a radio link to the Internet.

The above-mentioned object is also met by a module for a terminal or for a processing device which comprises respective processing means.

Furthermore, said object is met by a navigation system comprising a terminal according to the invention and a processing device according to the invention.

Finally, the object is met by a method for displaying navigation icons on display means of a terminal of a navigation system, comprising the following steps:

determining partial graphics in the terminal from which graphics a navigation icon currently suitable for route guidance can be composed;

selecting the partial graphics from a storage means of the terminal;

composing the partial graphics to form the navigation icon; and displaying the navigation icon on the display means of the terminal.

The invention is based on the recognition that a large number of the required navigation icons are made up of repeatedly occurring partial graphics. It is thus intended that not all navigation icons which may occur as graphics are stored in the terminal. Instead, only the partial graphics from which all intended navigation icons can be composed are stored. To this effect, a defined set of partial graphics is permanently stored in the terminal of the user, with this set of partial graphics being able to be expanded without any problem. The processing device, in particular the processing device of a service provider, then merely communicates to the terminal information from which the terminal can determine the partial graphics which are to be used for displaying a required intersection geometry.

The solution according to the invention thus provides a reduction in storage requirements in the terminal so that a larger number of different navigation icons can be displayed. Furthermore, the navigation system provided is very flexible because new navigation icons can be displayed without any problem by new compositions of the existing partial graphics, if necessary after respective supplementation of the partial graphics.

Advantageous embodiments of the device according to the invention and of the method according to the invention are provided in the subordinate claims.

Preferably the terminal according to the invention operates in conjunction with a processing device according to the invention, said processing device, on the basis of start information and destination information, calculating a route, so that the route need not be determined in the terminal itself. The processing device then conveys information to the terminal which information allows said terminal to compose partial graphics to form currently required navigation icons. The terminal comprises transmission means for communication with the processing device. Furthermore, the terminal should comprise a user interface accessible to the user; with said interface making it possible to establish a connection to the processing device and at least making it possible to enter or select the destination information. The start information can either also be entered or selected, or it can be provided automatically. If necessary, the respective input can also be voice-controlled, for example via a telephone call.

The information which can be conveyed to the terminal from the processing device, can have different content. Only access to the partial graphics in the storage device of the terminal has to be ensured accordingly.

Thus, in a preferred embodiment, for a respective navigation icon, the processing device communicates to the terminal identification of partial symbols from which the navigation icon can be composed. Each partial symbol comprises a partial graphic in a specified relative position. For each partial symbol, the terminal refers to a specified stored partial graphic. In addition, for each partial symbol, the relative position of the partial graphic for this partial symbol, is stored. The relative position can be defined in particular by an offset in x- and y-directions, starting from the position of the stored partial graphic. In order to display the navigation icon, for all received identifications of partial symbols, the terminal selects the respective partial graphics and their relative positions and composes them on the display means of the terminal so as to form the navigation icon.

In an advantageous improvement of this preferred embodiment, the processing device additionally communicates to the terminal an identification of the required navigation icons. It is then provided for the terminal, in respect of each possible navigation icon, to have stored information about the relative position of the complete navigation icon. Here again, the relative position is preferably specified by an offset in x- and y-directions; this time in relation to the display area on the display means of the terminal. After composition of a navigation icon, said icon is then positioned at the intended position on the display means of the terminal, according to the details about its relative position. Such a design is advantageous if navigation icons are not always to appear in the same position, but instead in various positions of the display of the terminal, for example in order to be able to display a combination of several navigation icons.

It is advantageous if the data necessary for determining the partial graphics, is stored in tables in the terminal. Thus the embodiment just described can comprise a first table in which for each partial symbol identification of the partial graphic and the offsets associated with the partial symbol, in x- and y-directions are stored. Furthermore, a second table can comprise the offsets in x- and y-directions, for the relative position of each complete navigation icon.

As an alternative to determining the partial graphics in the way described above, the processing device can communicate to the terminal exclusively an identification of the required navigation icons. In this way, for each possible navigation icon, the terminal has the information concerning the required partial graphics and their relative positions stored in the navigation icon. For each navigation icon, a direct reference can be made to the partial graphics, whereby at the same time the relative position for each partial graphic of a navigation icon is stored. But it is also possible that only an identification of the required partial symbols is associated with the navigation icons, whereby for each possible partial symbol a reference to a partial graphic and its relative position is made separately for use in several navigation icons. In the terminal, the data for the partial graphics associated with the current navigation icon is selected from the storage device and shown, composed according to the respective relative position to the navigation icon. In this embodiment, particularly little data needs to be conveyed from the processing device to the terminal, namely in each instance only an identification of the navigation icons to be displayed.

It is also possible that only the partial graphics are stored in the terminal in an identifiable way. In this case, by way of information, the processing device conveys to the terminal the partial graphics required for a navigation icon, as well as the relative positions of said partial graphics.

In the terminal, the partial graphics are selected according to the identification received, and composed according to the information, also received, concerning the respective relative position on the display means of the terminal. In this embodiment, the extent of the data stored in the terminal is particularly small. Similarly, the processing effort in the terminal is more limited than it is in the embodiment in which only an identification of the navigation icons is conveyed.

Apart from the proposed embodiments, it is however also possible to use any other suitable combinations of conveyed information and stored references, as long as the partial graphics are stored in the terminal and the information conveyed makes it possible to compose, in the terminal, the required navigation icons from these partial graphics.

It is advantageous if representation on the display means of the terminal takes place in that a first partial graphic replaces the present representation of the display means by a COPY instruction, and in that said partial graphic is offset to the desired position. If further partial graphics are necessary to display the navigation icon, then a further partial graphic can be added to the display of the first partial graphic by a logic instruction (OR, or XOR; AND), and is offset to the desired position until the navigation icon is positioned completely and displayed properly. Composition can however also be based on other suitable instructions.

The navigation system according to the invention, with terminal and processing device, and the method according to the invention, are in particular intended for use in vehicles. However, based on the possible decentralised calculation of route guidance, the navigation system may also be considered for other forms of traffic, such as for pedestrians.

BRIEF DESCRIPTION OF THE DRAWINGS

Below, one embodiment of the invention is explained in more detail with reference to the drawing. The following are shown:

FIGS. 2a, b: reading in of tables in an embodiment according to the invention;

FIGS. 3a, b: enumerations of partial symbols and navigation icons in an embodiment according to the invention;

FIGS. 5a, b: configuration data for the navigation icon in FIG. 4a in an embodiment according to the invention;

FIG. 6: interface structure between the application and the display means of a terminal in an embodiment according to the invention;

FIGS. 8a–e: a section of a program code according to an embodiment according to the invention, for composing the navigation icon in FIGS. 7a–c.

DETAILED DESCRIPTION

The embodiment is based on a navigation system in which an application of a WAP-capable mobile telephone acts in unison with the processing unit of an Internet service provider.

A user who would like to travel in his/her vehicle from a start position to a destination position, establishes contact with the service provider via the mobile telephone and conveys the starting position and the destination position to said service provider. From the positions received, the service provider calculates the optimal route taking into account current traffic reports and conveys, to the mobile telephone, information with an identification of the navigation icons which are required for displaying the route, and an identification of partial symbols from which the navigation icons can be composed. The term "partial symbol" refers to a partial graphic which has already been placed at a specific position.

All partial graphics from which partial symbols and thus also the navigation icons can be formed, are stored in the mobile telephone. From the identification of the respective partial symbols, the mobile telephone determines the required partial graphics and composes them in a mutually attuned position. From the identification of the navigation icons, the composed overall symbol is then placed for display in the correct position on the display of the mobile telephone.

Below, there is a detailed explanation on how to determine and compose partial symbols.

Figure 1A:
FIGS. 1a–d: an extract from a set with partial graphics of an embodiment according to the invention.
Figure 1B:
Figure 1C:
Figure 1D:
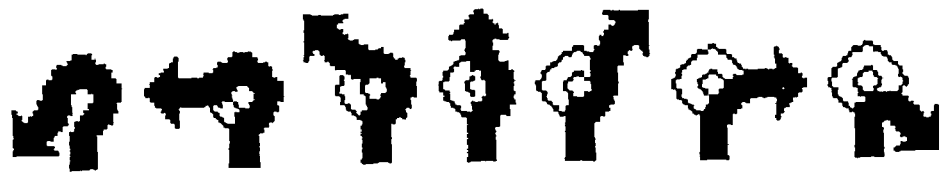

FIGS. 1a to 1d show various partial graphics which constitute an extract from the set of partial graphics stored in the mobile telephone. FIG. 1a shows different arrows which can indicate the exit street or road of an intersection. (For the sake of brevity the term "street" is used in this document although it may also refer to "road".) FIG. 1b shows various streets which are to be used in the particular street situation shown. FIG. 1c shows different streets which can display the surroundings of the streets to be taken, while FIG. 1d shows different directions for driving in roundabouts or traffic circles.

To allow access to these partial graphics and to allow their composition according to the navigation icon required for a given situation, the mobile telephone comprises two tables.

The first table allocates a bitmap with one of the partial graphics and offset details, to each possible partial symbol. In this way, a stored partial graphic can be used for a multitude of partial symbols which differ only by their relative position in a navigation icon.

The second table comprises offset details for a complete navigation icon. Thus, a navigation icon is placed in the centre of the display if it is to be shown on its own, but it is offset towards the top, bottom, right or left, if it is to be shown in combination with another navigation icon, for example for two intersections following in close proximity.

Using the two tables provided, the respective application in the mobile telephone can very easily handle the offset of the partial symbols and of the navigation icons.

FIG. 2a shows one example for reading-in the first table. Associated with the name of a particular partial symbol, a bitmap identification, an offset in x-direction and an offset in y-direction are read-in. FIG. 2b shows an example for reading-in the second table. Here, associated with the name of a particular navigation icon, an offset in x-direction and an offset in y-direction is read in.

The macro definition in the header file, shown in FIG. 3a, can be used by the application of the mobile telephone, for enumerating the partial symbols which are required to display a navigation icon. The enumeration values are used to reference the offset details for the partial symbols in the first table.

The macro definition in the header file, shown in FIG. 3b, can be used for enumerating the names of the navigation icons which are to be shown in the display of the mobile telephone. These enumeration values are used to reference the offset details for the navigation icons in the second table.

Figures 4A, 4B:
FIGS. 4a, b: exemplary composition of a simple navigation icon.

By way of an example, FIG. 4a shows a navigation icon which is to be shown on the display means of the mobile telephone. The navigation icon shows an intersection where eight streets meet, with the vehicle entering from the bottom and leaving the intersection in the upper right direction. The navigation icon can be composed from the six different partial graphics shown in FIG. 4b, with the fourth and the fifth partial graphic having to be used twice. The first icon shows the entry to the intersection, while the sixth, arrow-shaped icon, represents the exit from the intersection. The remaining icons show streets in the intersection where the vehicle is not to travel. The partial graphics which were selected from the set in FIGS. 1a–d, are composed as partial symbols, with a particular offset, so that they assume the correct position in the navigation icon from FIG. 4a.

A configuration file is generated so as to be able to handle, in a particular form, all information for a navigation icon to be shown. Within this file, two macros are used, one of which specifies the names of the partial symbols and the associated bitmaps and offset details, while the other macro provides the offset details for the complete navigation icon.

By way of an example, FIGS. 5a and 5b show a data extract for the navigation icon in FIG. 4b.

FIG. 5a contains the data of the configuration file for the partial symbol in FIG. 4b which indicates the exit street by way of an arrow. In the file, the partial symbol (DRA icon element) is called JUNC_EXIT_5, while the bitmap used for display is called BITM_STP_NAV_ARROW_5. The bitmap for this partial symbol comprises an offset in x-direction of 12, and an offset in y-direction of 1. This determines the position of the bitmap in the entire navigation icon (complete DRA icon).

FIG. 5b contains the data of the configuration file for the entire navigation icon from FIG. 4b which is called SINGLE_JUNC. Since the navigation icon is to be used on its own in this case, it is placed in the middle of the display by means of a respective offset in x- and y-directions.

The mobile telephone receives the information as to the particular navigation icon to be displayed, from the service provider. The application in the mobile telephone analyses the information received and uses the first and the second table in order to file the data for the partial symbols to be used, in a special dynamic data structure for display. This dynamic data structure forms an interface structure between the application in the mobile telephone and the display means of the mobile telephone. The data structure can be defined as shown in FIG. 6. In this instance, firstly a structure WIN_BITMAP_OFFSET_STR is provided for bitmap identification and the associated offset in x- and y-directions; and secondly, with WIN_NAV_BITMAP_STR, a structure is provided for the number of bitmaps to be displayed as well as an indicator to a list of the respective bitmap identification, including x- and y-offsets.

A procedure for displaying the navigation icon is able to display a partial symbol by copying, with the current representation on the display means being replaced by a first partial symbol, i.e. by a first partial graphic at the position indicated by x- and y-offsets. Insofar as this is necessary, said partial graphic is supplemented with further partial symbols with specified offsets in x- and y-directions.

Below, the act of composing a combined navigation icon is described with reference to FIGS. 7a–c and 8a–e.

Figure 7A:
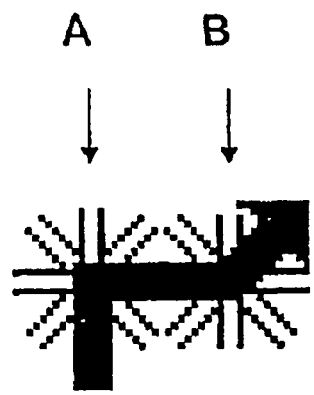
FIGS. 7a–c: exemplary composition of a combined navigation icon.

FIG. 7a shows the combined navigation icon to be shown on the display of the mobile telephone.

The navigation icon comprises two adjacent star-shaped intersections A and B, each with 8 streets. The vehicle is to enter the left intersection A from below and leave it to the right, then enter the adjacent right intersection B from the left and leave this intersection towards the top right.

Figure 7B:
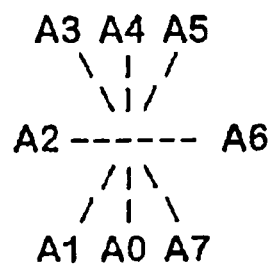
Figure 7C:
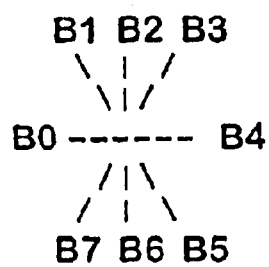

In FIG. 7b the eight streets of the first intersection A and in FIG. 7c the eight streets of the second intersection B are consecutively numbered from A0 to A7, and B0 to B7 respectively. The streets are consecutively numbered clockwise, always starting with the entry street on which the vehicle enters. Therefore, at the first intersection, counting starts at the bottom with A0 while in the second intersection, counting starts on the left with B0. The intersection geometry shown in FIG. 6c is thus rotated by 90° clockwise, when compared to the intersection geometry shown in FIG. 6b.

Altogether 16 partial symbols are required in order to be able to display the combined navigation icon; one partial symbol for each of the eight streets A0–A7, B0–B7 of the two intersections. However, only 12 different partial symbols are needed, and with the use of respective offsets, only 7 different bitmaps. In the set of partial graphics in FIGS. 1a–d these are the sixth arrow in FIG. 1a as well as the two streets in FIG. 1b for the streets along which the vehicle is to drive; and in addition all four streets shown in FIG. 1c for the adjacent streets along which the vehicle is not to drive.

A code extract continuously distributed among FIGS. 8a–e shows the composition of the required partial symbols in a data structure provided and the display on the display means of the mobile telephone. Numbers have been allocated to certain lines of the extract. Below, reference is made to these numbers.

For composing the required data for the combined navigation icon, first, from line 1 onwards, a data structure nav_maneuver_data has been provided and counters are defined and set.

Then, from line 2 onwards, the number of bitmaps to be displayed, i.e. 16, are allocated to the provided variables of the data structure nav_maneuver_data.bitmap_quantity. Then, from line 3 onwards, storage space is allocated to the list nav_maneuver_data.bitmap_list, in which the data is compiled to form the combined navigation icon, said storage space depending on the number of bitmaps to be displayed.

Subsequently, from line 4 onwards, assembly of the partial symbols for the first intersection A on the left of the combined navigation icon is started. To this effect, for all required bitmaps, the bitmap identification and the offset in x- and in y-directions are read into the list provided at the respective position nav_maneuver_data.bitmap_list[i].bitmap_id;
nav_maneuver_data.bitmap_list[i].x_start; or
nav_maneuver_data.bitmap_list[i].y_start;

with i denoting the position in the list; i being incremented by 1 after each partial symbol. Reading-in starts at the entry street element A0 (from line 5 onwards), followed by the adjacent street elements which are not to be driven on, A1 to A5 and A7 (from lines 6–11 onwards). Finally the information for the exit street element A6 (from line 12 onwards) is read in.

After reading-in all data relating to the partial symbols for the first intersection A, from line 13 onwards in each instance the offset in x- or in y-direction for placement of the entire first intersection A is added to the offsets in x- or y direction. Since the two intersections A, B of the combined navigation icon are to be located side-by-side, with the first intersection A to be on the left, the offset for the entire first intersection A is selected such that all partial symbols are offset in the same way to the left part of the display means of the terminal.

Now the list nav_maneuver_data.bitmap_list, from line 14 onwards, is supplemented by the respective data concerning the partial symbols for the second intersection B. Again starting with the entry street B0 to the intersection B (from line 15 onwards), followed by all streets B1, B2 and B4 to B7 (from line 16–21 onwards) along which the vehicle is not to drive, and finally followed by the exit street B3 (from line 22 onwards), the respective information for the second intersection B is read into the list.

For the second intersection B, too, as a last step (from line 23 onwards) the offset in x- and in y-directions for the entire second intersection B is added to the offsets for the individual bitmaps so that the second intersection B can be displayed in the right half of the display means of the terminal.

Finally, the combined navigation icon assembled in this way, comprising the first intersection A and the second intersection B, can be displayed on the display means of the mobile telephone via calling up a respective function, in the present example win_write (from line 24 onwards).

Figure 9A:
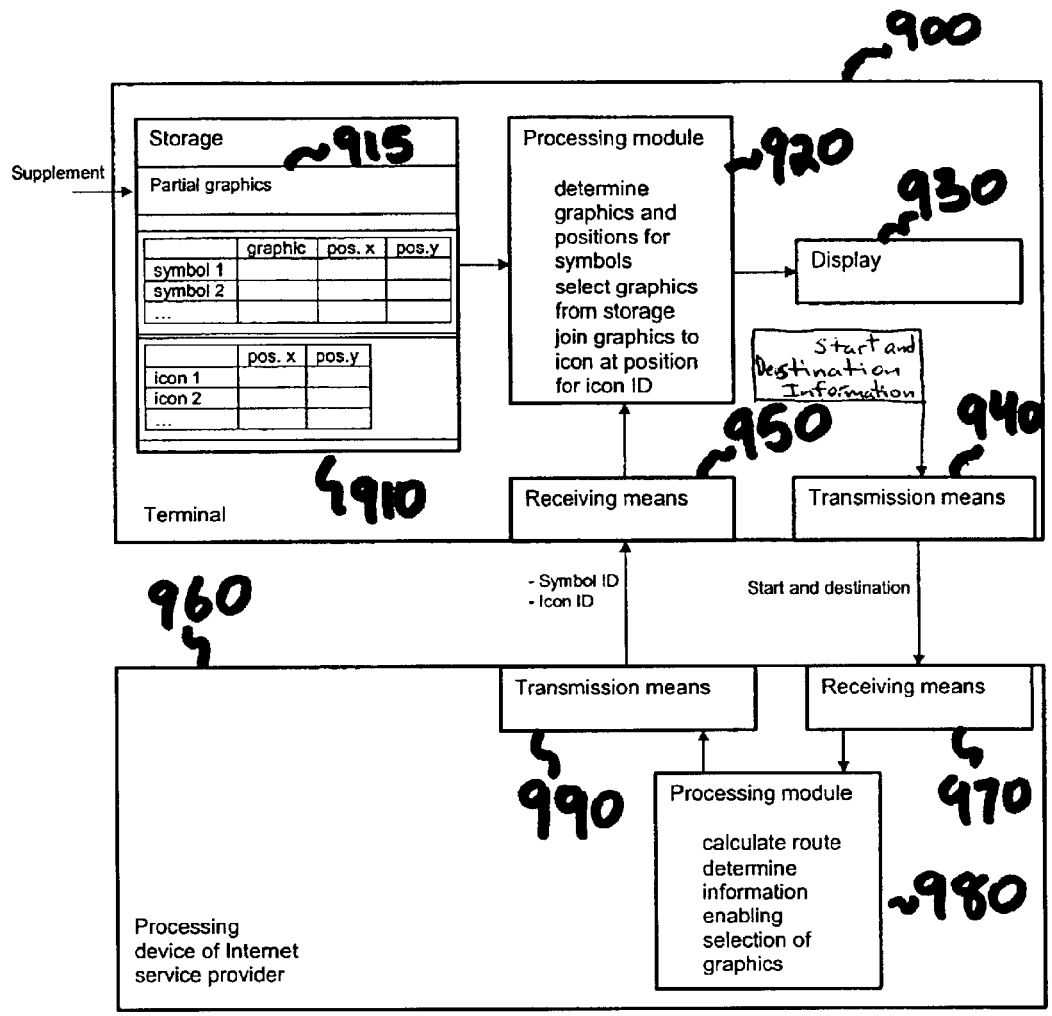
FIGS. 9a–b: block diagrams showing the terminal according to an embodiment of the present invention, interacting with an internet service provider

As seen in FIG. 9A, the present invention provides a terminal 900 as well as a processing device 960 for a navigation system which allow flexible display of navigation icons while making efficient use of the storage space.

The terminal 900 comprises storage means 910 for storing partial graphics 915 from which navigation icons can be composed, and processing means 920 for determining partial graphics from which a navigation icon suitable for current route guidance can be composed, for selecting the determined partial graphics from the storage means, and for joining the selected partial graphics to the navigation icon. The terminal also comprises display means 930 to display the joined navigation icon, a receiver 950, and a transmitter 940.

The processing device 960 of the navigation system comprises receiving means 970 for receiving start information and destination information from the terminal 900 of the navigation system, processing means 980 for calculating a route from received starting information and received destination information, and for determining and providing information from which partial graphics can be determined in the terminal, said partial graphics making it possible to compose navigation icons suitable for route guidance. The processing device also includes transmission means 990 for transmitting to the terminal the information which has been provided.

Figure 9B:
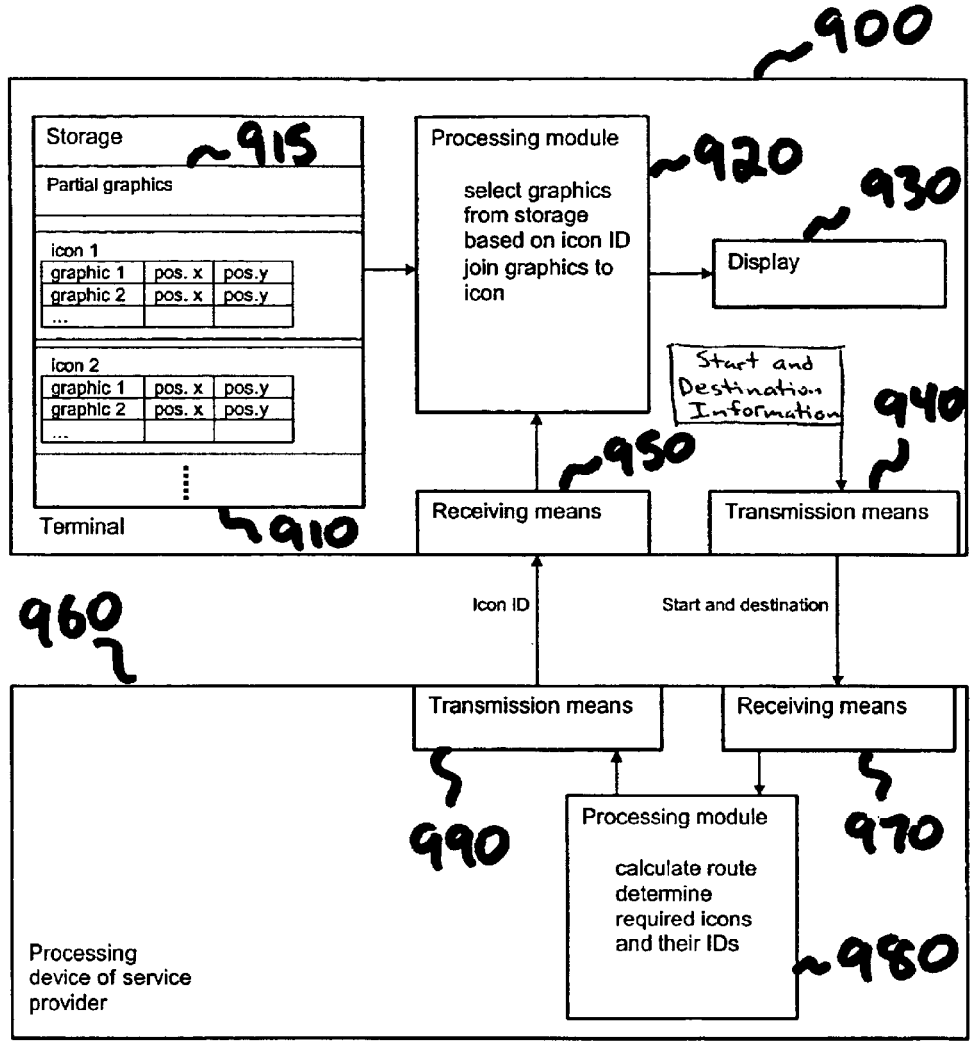

Additionally, as shown in FIG. 9B, the object of the present invention can be met by an embodiment in which the terminal 900 displays navigation icons on display means 930 of the terminal of a navigation system, wherein:

partial graphics 915 are determined in the terminal, from which graphics a navigation icon currently suitable for route guidance can be composed, the partial graphics are selected by the processing module 920 from the storage means 910 of the terminal, the partial graphics are composed to form the navigation icon; and the navigation icon is displayed on the display means 930 of the terminal.

The invention is based on the recognition that a large number of the required navigation icons are made up of repeatedly occurring partial graphics. It is thus intended that not all navigation icons which may occur as graphics are stored in the terminal. Instead, only the partial graphics from which all intended navigation icons can be composed are stored. To this effect, a defined set of partial graphics is permanently stored in the terminal of the user, with this set of partial graphics being able to be expanded without any problem. The processing device, in particular the processing device of a service provider, then merely communicates to the terminal information from which the terminal can determine the partial graphics which are to be used for displaying a required intersection geometry.

In an advantageous improvement of this preferred embodiment, the processing device 960 additionally communicates to the terminal an identification of the required navigation icons. It is then provided for the terminal, in respect of each possible navigation icon, to have stored information about the relative position of the complete navigation icon.

What is claimed is:

1. A terminal for a navigation system comprising:

storage means for storing partial graphics from which navigation icons, suitable for route guidance, can be composed;

processing means for determining partial graphics from which a navigation icon suitable for current route guidance can be composed, for selecting the determined partial graphics from the storage means and for joining the selected partial graphics to the navigation icon, wherein the relative positions of the partial graphics are variable and selected as required for composing said navigation icon; and display means to display the joined navigation icon.

2. The terminal according to claim 1, characterised by transmission means for transmitting start information and destination information to a processing device of the navigation system; and receiving means for receiving information from the processing device from which the partial graphics can be determined, from which partial graphics a currently required navigation icon can be composed;

whereby, from the information received from the processing device, the processing means determine the partial graphics from which a currently required navigation icon can be composed.

3. The terminal according to claim 2, characterised in that the storage means are arranged for storing, in addition to the partial graphics, allocated to a partial symbol a reference to a particular partial graphic stored and a particular relative position of the partial graphic, whereby each partial symbol comprises the allocated partial graphic at the allocated relative position;

the receiving means are suitable for receiving information from the processing device, which information identifies the partial symbols from which information navigation icons which are currently to be displayed can be composed; and the processing means are suitable for determining partial graphics from information received in relation to partial symbols which form a navigation icon that is currently to be displayed, and for composing the partial graphics according to the relative position stored for the respective partial symbol.

4. The terminal according to claim 3, characterised in that the storage means are suitable, in addition to each navigation icon provided, for storing information resulting in the desired relative position of said navigation icon on the display means;

the receiving means are suitable, in addition, to receive information from the processing device, which information identifies the navigation icons currently to be displayed; and the processing means are suitable, by means of the information received, for reading out the relative position associated with the respective current navigation icon, from the storage means, and to offset the navigation icon composed from the partial graphics, for display according to the relative position.

5. The terminal according to claim 2, characterised in that the storage means are suitable for storing, in addition to the partial graphics, information for each navigation icon provided, from which information the partial graphics required for said navigation icon and their respective relative position in said navigation icon can be determined;

the receiving means are suitable for receiving information from the processing device, which information identifies a respective navigation icon which is currently to be displayed; and the processing means are suitable, according to the information received for a navigation icon, for determining the partial graphics required for said navigation icon and the relative position of said partial graphics in said navigation icon, and for selecting them from the storage means and for joining the selected partial graphics to form said navigation icon, by means of the information concerning the relative position of each partial graphic.

6. The terminal according to claim 2, characterised in that the receiving means are suitable for receiving, from the processing device, information for each navigation icon to be displayed, with said information identifying the partial graphics from which the navigation icon can be composed, and which for each partial graphic to be identified, contains information concerning the relative position of the partial graphic; and the processing means are suitable for selecting from the storage means the partial graphics by means of the information identifying the partial graphics, and for joining the selected partial graphics by means of the information concerning the relative position of each partial graphic, to form a navigation icon.

7. The terminal according to claim 1, characterised in that the partial graphics stored in the storage means can be supplemented.

8. A terminal for a navigation system comprising:

storage means for storing partial graphics from which navigation icons, suitable for route guidance, can be composed;

processing means for determining partial graphics from which a navigation icon suitable for current route guidance can be composed, for selecting the determined partial graphics from the storage means and for joining the selected partial graphics to the navigation icon, wherein the relative positions of the partial graphics are variable and selected as required for composing said navigation icon;

display means to display the joined navigation icon;

transmission means for transmitting start information and destination information to a processing device of the navigation system;

receiving means for receiving information from the processing device from which the partial graphics can be determined, from which partial graphics a currently required navigation icon can be composed;

whereby, from the information received from the processing device, the processing means determine the partial graphics from which a currently required navigation icon can be composed;

the storage means are arranged for storing, in addition to the partial graphics, allocated to a partial symbol a reference to a particular partial graphic stored and a particular relative position of the partial graphic, whereby each partial symbol comprises the allocated partial graphic at the allocated relative position;

the receiving means are suitable for receiving information from the processing device, which information identifies the partial symbols from which information navigation icons which are currently to be displayed can be composed;

the processing means are suitable for determining partial graphics from information received in relation to partial symbols which form a navigation icon that is currently to be displayed, and for composing the partial graphics according to the relative position stored for the respective partial symbol;

the storage means are suitable, in addition to each navigation icon provided, for storing information resulting in the desired relative position of said navigation icon on the display means;

the receiving means are suitable, in addition, to receive information from the processing device, which information identifies the navigation icons currently to be displayed;

the processing means are suitable, by means of the information received, for reading out the relative position associated with the respective current navigation icon, from the storage means, and to offset the navigation icon composed from the partial graphics, for display according to the relative position; and the storage means comprise a first table in which for each partial symbol an identification of the associated partial graphic and as an associated relative position, offsets in x-direction and in y-direction are stored; and a second table in which for each navigation icon, for the relative position on the display means, offsets in x-direction and in y-direction are stored.

9. A terminal module for a terminal for a navigation system wherein the navigation system comprises storage means for storing partial graphics from which navigation icons, suitable for route guidance, can be composed;

wherein the terminal module comprises processing means for determining partial graphics from which a navigation icon suitable for current route guidance can be composed, for selecting the determined partial graphics from the storage means and for joining the selected partial graphics to the navigation icon, wherein the relative positions of the partial graphics are variable and selected as required for composing this specific navigation icon; and wherein the navigation system further comprises display means to display the joined navigation icon.

10. A processing device of a navigation system comprising:

receiving means for receiving start information and destination information from a terminal of the navigation system;

processing means for calculating a route from received starting information and received destination information, and for determining and providing information from which partial graphics and their relative positions in a specific navigation icon can be determined in the terminal, wherein the relative position of each partial graphic is variable, said partial graphics and their relative positions making it possible to compose navigation icons suitable for route guidance; and transmission means for transmitting to the terminal the information that has been provided.

11. The processing device according to claim 10, characterised in that by way of information, the processing means provide information from which the partial graphics can be determined in the terminal, with said information identifying the partial symbols to be used for the navigation icons currently to be displayed; said partial symbols comprising a partial graphic at a specified relative position in the navigation icon.

12. The processing device according to claim 11, characterised in that in addition, the processing means provide information identifying the navigation icons, in order to make it possible to determine the relative position of the navigation icons on display means of the terminal.

13. The processing device according to claim 10, characterised in that by way of information from which the partial graphics can be determined in the terminal, the processing means provide information which identifies currently required navigation icons.

14. The processing device according to claim 10, characterised in that by way of information from which the partial graphics can be determined in the terminal, the processing means provide identifying information which makes it possible to compose currently required navigation icons as well as their relative position in the navigation icons.

15. A processing module for a processing device for a navigation system wherein the navigation system comprises receiving means for receiving start information and destination information from a terminal of the navigation system;

wherein the processing module comprises processing means for calculating a route from received starting information and received destination information, and for determining and providing information from which partial graphics and their relative positions in a specific navigation icon can be determined in the terminal, wherein the relative position of each partial graphic is variable, said partial graphics and their relative positions making it possible to compose navigation icons suitable for route guidance; and wherein the navigation system further comprises transmission means for transmitting to the terminal the information that has been provided.

16. A navigation system comprising a terminal and a processing device, the terminal including:

storage means arranged for storing partial graphics from which navigation icons, suitable for route guidance, can be composed;

processing means for determining partial graphics from which a navigation icon suitable for current route guidance can be composed, for selecting the determined partial graphics from the storage means and for joining the selected partial graphics to the navigation icon, wherein the relative positions of the partial graphics are variable and selected as required for composing this specific navigation icon; and display means to display the joined navigation icon; wherein the processing device includes:

receiving means for receiving start information and destination information from the terminal;

processing means for calculating a route from received starting information and received destination information, and for determining and providing information from which partial graphics and their relative positions in a specific navigation icon can be determined in the terminal, wherein the relative position of each partial graphic is variable, said partial graphics and their relative positions making it possible to compose navigation icons suitable for route guidance; and transmission means for transmitting to the terminal the information that has been provided.

17. A method for displaying navigation icons on display means of a terminal of a navigation system, comprising the following steps:

determining partial graphics in the terminal, from which partial graphics a navigation icon currently suitable for route guidance can be composed;

selecting the partial graphics from a storage means of the terminal, wherein the relative positions of the partial graphics are variable;

composing the partial graphics to form the navigation icon in accordance with the relative positions of the partial graphics required for the navigation icon; and displaying the navigation icon on the display means of the terminal.

18. The method according to claim 17, further comprising the steps of:

transmitting start information and destination information from the terminal to a processing device of the navigation system;

calculating a route from the received start information and destination information in the processing device and providing information from which partial graphics can be determined in the terminal, from which partial graphics navigation icons suitable for illustrating the calculated route can be composed; and transmitting the information provided, for the determined navigation icons, from the processing device to the terminal;

whereby determining the partial graphics required for composing a currently suitable navigation icon takes place in the terminal on the basis of information received from the processing device.

19. The method according to claim 18, characterised in that the information transmitted by the processing device and used by the terminal for determining the partial graphics comprises identification of partial symbols comprising a partial graphic at a specified relative position, and in that the terminal selects from storage means of the terminal the partial graphics which are associated with the partial symbols and the relative positions associated with the partial symbols, and composes the partial graphics according to the relative position in relation to the navigation icon.

20. The method according to claim 19, characterised in that the information transmitted from the processing device in addition comprises identification of the currently suitable navigation icons and in that, from the respective identification, the terminal determines the relative position of an entire navigation icon, displaying the navigation icon accordingly.

21. The method according to claim 18, characterised in that
the information transmitted from the processing device and used by the terminal for determining the partial graphics, is information which identifies currently suitable navigation icons.

22. The method according to claim 18, characterised in that
the information transmitted from the processing device and used by the terminal for determining the partial graphics is information which identifies the partial graphics as well as their relative position in the navigation icon.

23. A method for displaying navigation icons on display means of a terminal of a navigation system, comprising the following steps:
determining partial graphics in the terminal, from which partial graphics a navigation icon currently suitable for route guidance can be composed;

selecting the partial graphics from a storage means of the terminal, wherein the relative positions of the partial graphics are variable;

composing the partial graphics to form the navigation icon in accordance with the relative positions of the partial graphics required for the navigation icon; and displaying the navigation icon on the display means of the terminal;

wherein the composition of partial graphics on the display means takes place in that a first partial graphic replaces the present representation of the display means by a COPY instruction, and in that the said partial graphic is offset to the desired position, and insofar as this is required, any further partial graphics are added to the display of the first partial graphic by a logic instruction, and are offset to the desired position until a complete navigation icon has been composed.

* * * * *